(12) United States Patent
Joo et al.

(10) Patent No.: US 7,867,941 B2
(45) Date of Patent: Jan. 11, 2011

(54) SULFUR-CONTAINING MESOPOROUS CARBON, METHOD OF MANUFACTURING THE SAME, AND FUEL CELL USING THE MESOPOROUS CARBON

(75) Inventors: Sang Hoon Joo, Yongin-si (KR); Chan-ho Pak, Seoul (KR); Hyuk Chang, Seongnam-si (KR); Ji-man Kim, Seoul (KR); Hyung-ik Lee, Seongnam-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 315 days.

(21) Appl. No.: 11/966,266

(22) Filed: Dec. 28, 2007

(65) Prior Publication Data

US 2008/0160391 A1 Jul. 3, 2008

(30) Foreign Application Priority Data

Dec. 29, 2006 (KR) ..................... 10-2006-0138864

(51) Int. Cl.
*B01J 21/18* (2006.01)
*C01B 31/00* (2006.01)
*H01M 4/64* (2006.01)
(52) U.S. Cl. ................... 502/174; 423/414; 429/521
(58) Field of Classification Search ................ None
See application file for complete search history.

(56) References Cited

U.S. PATENT DOCUMENTS 7,282,466 B2 * 10/2007 Long et al. ............... 502/185
7,402,544 B2 * 7/2008 Pak et al. .................. 502/60
7,442,747 B1 * 10/2008 Long et al. ............... 525/505
2006/0099139 A1 5/2006 Long et al.

(Continued)

FOREIGN PATENT DOCUMENTS

KR 2001-1127 1/2001

OTHER PUBLICATIONS

Alonso et al.; Mesoporous Carbon-ontaining MoS2 Materials Formed From the In situ Decomposition of Tetraalkylammonium Thiomolybdates; Materials Research bulletin; 38, 1045-1055; 2003.*

(Continued)

*Primary Examiner*—Melvin C Mayes
*Assistant Examiner*—Guinever S Gregorio
(74) *Attorney, Agent, or Firm*—Lee & Morse, P.C.

(57) ABSTRACT

A sulfur-containing mesoporous carbon that has mesopores with an average diameter of 2 to 10 nm, a method of preparing the same, a catalyst containing the mesoporous carbon as a catalyst support, and a fuel cell using the catalyst in which the sulfur-containing mesoporous carbon has a good affinity for and adhesion to catalyst particles so as to strongly support the catalyst particles due to the sulfur atoms substituting for carbons in an OMC carbon skeleton structure. The growth of metal catalyst particles is prevented when heat-treating the metal catalyst particles. The catalyst using the sulfur-containing mesoporous carbon can be applied to a fuel cell to prevent a reduction in catalytic activity due to increased particle size by an accumulation of catalyst particles. The catalyst containing the sulfur-containing mesoporous carbon as a catalyst support can be used to manufacture a fuel cell having an improved performance.

9 Claims, 10 Drawing Sheets

U.S. PATENT DOCUMENTS

2007/0116624 A1* 5/2007 Joo et al. ............... 423/445 R
2007/0116625 A1* 5/2007 Joo et al. ............... 423/445 R
2007/0122334 A1* 5/2007 Pak et al. ............... 423/445 R

OTHER PUBLICATIONS

Baker et al.; Sulfur-Functionalized Carbon Aerogels: A New Approach for Loading High Surface Area Electrode Nanoarchitectures with Precious Metal Catalysts; Journal of Non-Crystalline solids; 350, 80-87; 2004.*

Office Action dated Nov. 14, 2007 of the Korean Patent Application No. 2006-138864.

* cited by examiner

SULFUR-CONTAINING MESOPOROUS CARBON, METHOD OF MANUFACTURING THE SAME, AND FUEL CELL USING THE MESOPOROUS CARBON

CROSS-REFERENCE TO RELATED PATENT APPLICATIONS

This application claims the benefit of Korean Patent Application No. 2006-138864, filed Dec. 29, 2006, in the Korean Intellectual Property Office, the disclosure of which is incorporated herein in its entirety by reference.

BACKGROUND OF THE INVENTION

1. Field of the Invention

Aspects of the present invention relate to a sulfur-containing mesoporous carbon, a method of manufacturing the same, and a fuel cell using the sulfur-containing mesoporous carbon, and more particularly, to a sulfur-containing mesoporous carbon having a high affinity to noble metal catalyst particles, a method of manufacturing the same, a supported catalyst using the sulfur-containing mesoporous carbon as a catalyst support, and a fuel cell using the supported catalyst.

2. Description of the Related Art

A catalyst plays an important role in fuel cell technology as the catalyst is contained in electrodes for the fuel cells to facilitate the electrochemical reaction therein; thus, many attempts have been made to increase the activity of the catalyst. Since the activity of the catalyst increases as the reaction surface area of the catalyst increases, the diameter of catalyst particles should be reduced to increase the reaction surface area of the catalyst and the catalyst should be uniformly distributed in the electrodes. As such, a catalyst support should also have a large surface area, and thus, much research has been dedicated to increasing the surface area of the catalyst support.

In addition to a large surface area, which may be obtained through high porosity, a catalyst support for a fuel cell should be electrically conductive so as to act as a path for the flow of electrons. Also, the catalyst support should support the catalyst particles such that the catalyst particles are highly dispersed, and the catalyst support should have a connected pore structure that facilitates the transfer and transport of fuels. Examples of such a catalyst support include amorphous microporous carbon powder, such as activated carbon or carbon black, structure-ordered carbon molecular sieve materials and the like. For example, see Korean Patent Laid-open Publication No. 2001-0001127.

However, the micropores of such amorphous microporous carbon particles are poorly connected. Therefore, in a conventional direct methanol fuel cell (DMFC), a supported catalyst that is prepared using amorphous microporous carbon particles as a catalyst support exhibits a lower reactivity than unsupported catalyst in which a metal particle itself is used as a catalyst.

However, if the metal particle itself is used as a catalyst, a large amount of the catalyst is required; thus, the manufacturing costs of the DMFC increase. Accordingly, the development of a supported catalyst that can improve the reactivity of a catalyst is urgently required.

One of the crucial problems of electrodes for fuel cells is an agglomeration of catalyst particles when driving the fuel cells for a long period or operating at a high temperature. The agglomeration of catalyst particles increases the size of the catalyst particles, which reduces the number of active sites and hence, the activity of an electrode reaction.

SUMMARY OF THE INVENTION

Aspects of the present invention provide a mesoporous carbon, which can effectively prevent an agglomeration of catalyst particles when driving fuel cells for a long period and operating at a high temperature, and a method of preparing the same.

Aspects of the present invention also provide a supported catalyst containing the mesoporous carbon and a fuel cell having good catalytic activity even when driving the fuel cell for a long period and operating at a high temperature, by preventing the growth of catalyst particles using the supported catalyst.

According to an aspect of the present invention, there is provided a sulfur-containing mesoporous carbon including sulfur and having mesopores with an average diameter of 2 to 10 nm.

According to another aspect of the present invention, there is provided a method of preparing a mesoporous carbon, the method including: mixing a sulfur-containing carbon source, an acid, and a solvent to obtain a sulfur-containing carbon source mixture; impregnating a mesoporous silica with the sulfur-containing carbon source mixture; drying and heating the impregnated product; carbonizing the resulting product; and removing the mesoporous silica from the carbonized product to obtain the sulfur-containing mesoporous carbon.

According to yet another aspect of the present invention, there is provided a supported catalyst including: the sulfur-containing mesoporous carbon; and metal catalyst particles that are supported on the mesoporous carbon.

According to still another aspect of the present invention, there is provided a fuel cell including: a cathode; an anode; and an electrolyte interposed between the cathode and the anode, wherein at least one of the cathode and the anode contains the supported catalyst including metal catalyst particles that are supported on the sulfur-containing mesoporous carbon.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
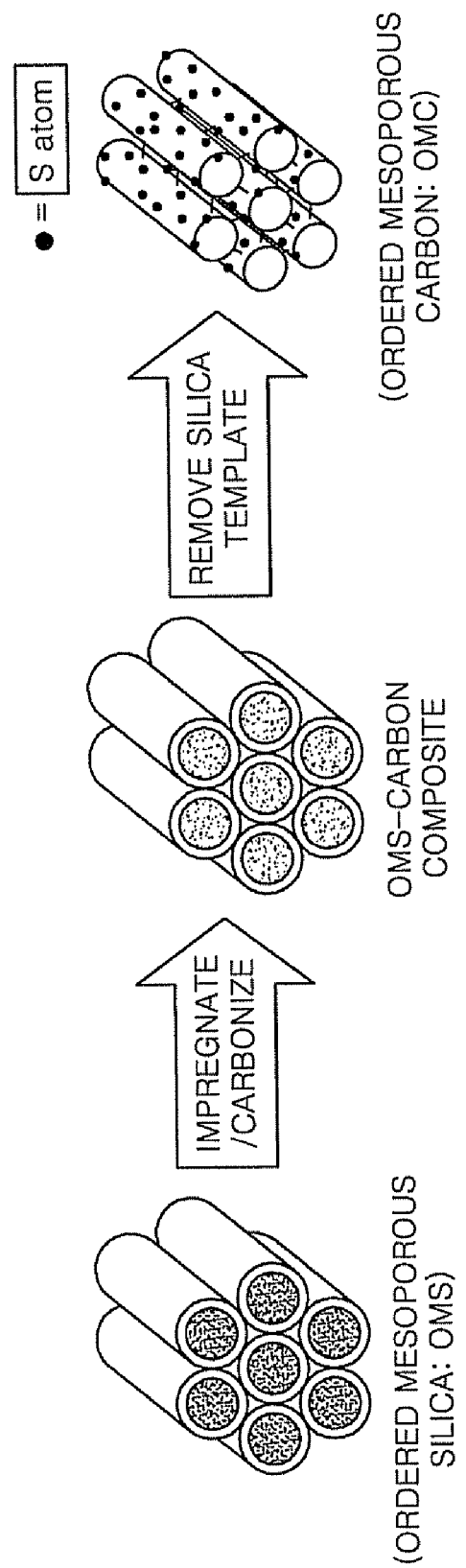
FIG. 1 illustrates a process of forming a mesoporous carbon according to aspects of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a sulfur-containing mesoporous carbon which can be used as a catalyst support. The sulfur-containing mesoporous carbon includes sulfur having a good affinity for and adhesion to catalyst particles; thus, the sulfur improves the stability of the catalyst particles and allows the catalyst particles to maintain the initial activity of a catalyst when the sulfur-containing mesoporous carbon is used as a catalyst support.

FIG. 1 schematically illustrates a process of forming a sulfur-containing mesoporous carbon according to aspects of the present invention. Referring to FIG. 1, a sulfur-containing carbon source is introduced into an ordered mesoporous silica (OMS) template, and then dried, heat treated, and carbonized to form an OMS-carbon composite. Herein, the OMS has an X-ray diffraction peak of about 2 degrees or less, i.e., the 2θ value is about 2 degrees or less, due to its regularly arranged pores. Then, the OMS template is removed from the OMS-carbon composite to obtain an ordered mesoporous carbon (OMC) including sulfur.

Figure 2A:
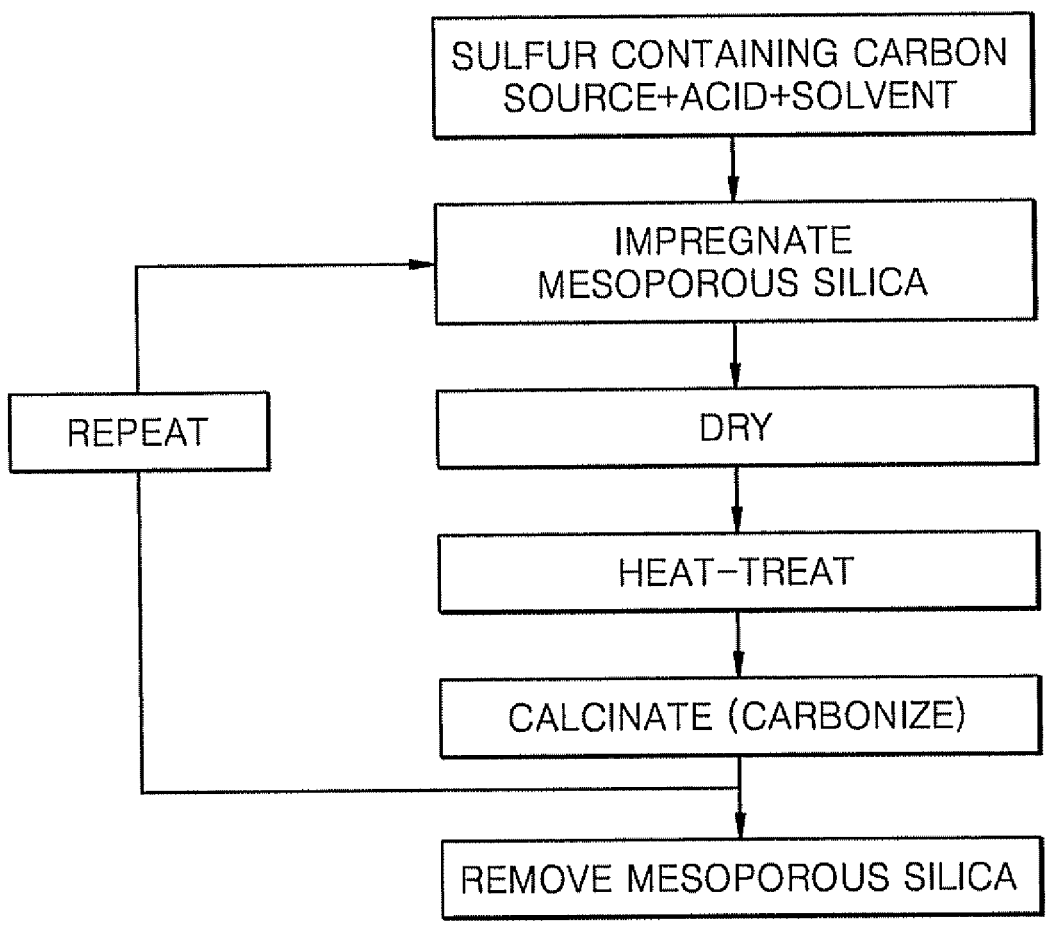
FIG. 2A is a flow chart of a method of manufacturing a mesoporous carbon according to aspects of the present invention.

A method of manufacturing a mesoporous carbon according to aspects of the present invention will now be described in detail with reference to FIG. 2A. A sulfur-containing carbon source, an acid, and a solvent are mixed to obtain a sulfur-containing carbon source mixture. The sulfur-containing carbon source is at least one material selected from the group consisting of furfuryl mercaptan, a mixture of furfuryl mercaptan and furfuryl alcohol, monobenzothiophene, dibenzothiophene, p-polyphenylene sulfide, and organic sulfuric acid such as p-toulenesulfonic acid.

If the sulfur-containing carbon source includes a mixture of furfuryl mercaptan and furfuryl alcohol, the amount of furfuryl alcohol may be 1000 parts by weight or less, in particular, the amount of furfuryl alcohol may be 1 to 800 parts by weight, based on 100 parts by weight of furfuryl mercaptan. The acid may be an organic acid or an inorganic acid. Examples of the acid include sulfuric acid, nitric acid, phosphoric acid, and para-toluene sulfuric acid. The solvent may be any solvent that can uniformly disperse the sulfur-containing carbon source. Particularly, the solvent may be water, acetone, methanol, ethanol, isopropylalcohol, n-propylalcohol, butanol, dimethylacetamide, dimethylformamide, dimethylsulfoxide, N-methyl-2-pyrrolidone, tetrahydrofurane, tetrabutylacetate, n-butylacetate, m-crezole, toluene, ethyleneglycol, γ-butyrolactone, hexafluoroisopropanol (HFIP), or the like. However, these materials can be used alone or in combination.

The amount of acid in the sulfur-containing carbon source mixture may be in the range of 5 to 400 parts by weight based on 100 parts by weight of the sulfur-containing carbon source. If the amount of acid is less than 5 parts by weight based on 100 parts by weight of the sulfur-containing carbon source, the generation of a mesoporous carbon is not significantly facilitated. If the amount of acid is greater than 400 parts by weight based on 100 parts by weight of the sulfur-containing carbon source, the formation of a carbon material is facilitated even outside of the mesoporous silica, and thus, a degree of order of the OMC is reduced.

The amount of solvent may be in the range of 100-500 parts by weight based on 100 parts by weight of the sulfur-containing carbon source. If the amount of solvent is less than 100 parts by weight based on 100 parts by weight of the sulfur-containing carbon source, the solvent insufficiently dissolves the sulfur-containing carbon source. If the amount of solvent is greater than 500 parts by weight based on 100 parts by weight of the sulfur-containing carbon source, OMC particles significantly agglomerate.

An OMS is impregnated with the sulfur-containing carbon source mixture prepared as described above. Then, the impregnated OMS is dried, heat-treated, and carbonized to form an OMS-carbon composite.

The OMS may be a molecular sieve material structured such that one-dimensional pores are mutually connected by micropores; however, the OMS is not limited thereto. Hence, the OMS may be one of or a mixture of the following molecular sieve materials: MCM-48 having a cubic structure, SBA-1 having another cubic structure, SBA-15 having a hexagonal structure, KIT-1, MSU-1, MSU-H or the like, which has a three-dimensional connection structure. KIT-1 MSU-1, and MSU-H are each structured such that the pores are three dimensionally and irregularly connected. Furthermore, the OMS may be any type of a molecular sieve material that contains any type of mesoporous material structured such that one-dimensional pores are mutually connected by micropores.

The amount of the OMS that is impregnated with the sulfur-containing carbon source mixture may be in the range of 0.5 to 30 parts by weight based on 100 parts by weight of the sulfur-containing carbon source mixture. If the amount of OMS that is impregnated with the sulfur-containing carbon source mixture is less than 0.5 parts by weight, the amount of sulfur-containing carbon source mixture is relatively too high. As a result, after impregnation, OMC particles significantly agglomerate so that the surface area of the OMC decreases. If the amount of OMS that is impregnated with the sulfur-containing carbon source mixture is greater than 30 parts by weight, the amount of sulfur-containing carbon source is relatively too low so that a carbon structure is not sufficiently formed in the silica pores. The impregnation temperature is not particularly limited; however, the impregnation temperature may be room temperature.

If necessary, the impregnated mixture may be dried. The drying temperature is not particularly limited; however, the drying temperature may be room temperature or about 20° C. In addition, for quick drying, the drying process may be performed under a reduced pressure or vacuum.

The heat-treatment may be performed between 50 to 400° C. If the heat-treatment temperature is lower than 50° C., the structure of the mesoporous carbon may be inappropriately formed. If the heat-treatment temperature is higher than 400° C., the uniformity of the mesoporous carbon may decrease. Alternatively, the heat-treatment may be divided into a first heat-treatment and a second heat-treatment. For example, the first heat-treatment may be performed from about 50° C. to about 150° C. and the second heat-treatment may be performed from about 150° C. to about 400° C. Through the heat treatment, a mesoporous carbon structure is formed and a liquid solvent and the like are completely removed.

Even if the heat-treated resultant can be directly carbonized, the above-mentioned processes may be repeated two to ten times. Hence, the heat-treated resultant is impregnated with the sulfur-containing carbon source mixture prepared above, and then, the heat treatment is performed as described above. These processes may be further repeated or the subsequent carbonization may be performed. If the sulfur-containing carbon source mixture prepared above is directly carbonized without the repetition of the impregnation and the heat treatment, the mesoporous carbon structure may be incompletely formed in the mesoporous silica pores. On the other hand, the repetition of the impregnation and the heat treatment by more than 10 times is unnecessary because the effects attainable due to the repetitions are minimal.

As described above, the heat-treated resultant is carbonized to obtain a carbon structure. The carbon precursor that is impregnated into the mesoporous silica acting as a template is graphitized and structured through the carbonization. The carbonization may be achieved by heat-treating the resultant, for example, using a heating means such as an electric furnace at a temperature in the range of 600° C. to 1500° C. If the carbonization temperature is lower than 600° C., carbonization does not completely occur and the carbon structure may be incomplete. If the carbonization temperature is higher than 1500° C., carbon may thermally decompose or the structure of the OMS acting as the template may be deformed. The carbonization may be performed in a non-oxidative atmosphere that may be selected from a vacuum atmosphere, a nitrogen atmosphere, and an inert gas atmosphere.

Then, the OMS is removed from the OMS-carbon composite using a solvent that can selectively dissolve the mesoporous silica. Such a solvent that can selectively dissolve the OMS may include, for example, an aqueous HF solution or an aqueous NaOH solution. The concentration of the aqueous HF solution is 5-47 wt % and the concentration of the aqueous NaOH solution is 5-30 wt %.

The OMS is melted by alkali or fused by a carbonate to form a soluble carbonate and reacts with HF to form erodible $SiF_4$. The OMS may be removed to obtain the sulfur-containing mesoporous carbon.

The obtained sulfur-containing mesoporous carbon may be an ordered mesoporous carbon (OMC) in which pores are regularly arranged. Such characteristic can be confirmed by an X-ray diffraction analysis.

The amount of sulfur in the mesoporous carbon is 0.1 to 20 parts by weight based on 100 parts by weight of the sulfur-containing mesoporous carbon. If the amount of sulfur is less than 0.1 part by weight, the effects of adding a heteroatom, i.e., the sulfur, are trivial. If the amount of sulfur is greater than 20 parts by weight, the OMC is not sufficiently formed.

While a conventional amorphous microporous carbon powder only includes micropores, the sulfur-containing mesoporous carbon according to aspects of the present invention includes mesopores as well as micropores in a proper ratio. According to the definition of the International Union of Pure and Applied Chemistry (IUPAC), a micropore generally means a pore having a diameter of less than 2 nm, and a mesopore means a pore having a diameter of about 2 to 50 nm. Further, macropores include pores having diameters greater than about 50 nm.

The average diameter of a mesopore of the sulfur-containing mesoporous carbon according to aspects of the present invention may be in the range of 2 to 10 nm, preferably in the range of 3 to 6 nm, more preferably in the range of 3.5 to 5 nm, and most preferably 3.5 nm, 4 nm, and 5 nm.

The sulfur-containing mesoporous carbon according to aspects of the present invention may have a full width at half maximum (FWHM) of a main peak of 5 nm or less, and preferably in the range of 1 to 4.5 nm, wherein the main peak is obtained by a pore size distribution using nitrogen absorption properties. Herein, the pore size distribution using nitrogen absorption properties is obtained by measuring the average diameter and distribution of the sulfur-containing mesoporous carbon by using Tristar 3000 available from Micromeritics. The distribution of the sulfur-containing mesoporous carbon is calculated from a nitrogen absorption curve by using a Barrett-Joyner-Halenda (BJH) method, and the average diameter of the sulfur-containing mesoporous carbon is selected from the highest value in a peak having the strongest intensity among peaks represented by the distribution.

The term "full width at half maximum (FWHM)" used herein is calculated by fitting a generally applied mathematic model (Lorentzian or Gaussian) to a peak having the strongest intensity among peaks represented by a pore distribution.

In addition, the sulfur-containing mesoporous carbon according to aspects of the present invention has a Brunauer, Emmett, and Teller (BET) surface area of 200-2000 $m^2/g$ and a sheet resistance of 10-300 $m\Omega/cm^2$ at $150.8\pm3.0$ $kgf/cm^2$.

The sheet resistance of the sulfur-containing mesoporous carbon is measured using a 4-point probe method at a pressure of $150.8\pm3.0$ $kgf/cm^2$. The sheet resistance of the sulfur-containing mesoporous carbon according to aspects of the present invention is lower than that of the conventional mesoporous carbon.

When the average diameter of the mesopores is less than 2 nm, supplied fuel does not smoothly diffuse and the activity of the catalyst is limited. If the average diameter of the mesopore is greater than 10 nm, the size of the catalyst particle tends to increase when preparing the catalyst, and thus, a catalytic efficiency decreases.

If the BET surface area of the sulfur-containing mesoporous carbon is less than 200 $m^2/g$, it is difficult to improve the dispersion of metal particles that are to be supported. If the BET specific surface area of the sulfur-containing mesoporous carbon is greater than 2000 $m^2/g$, the diffusion of fuel is limited due to an excessive amount of micropores, and thus, the catalytic efficiency decreases.

Since pores in the sulfur-containing mesoporous carbon are regularly arranged, the main peak of the Bragg 2θ angle at a CuK-α characteristic X-ray wavelength of 1.541 Å appears at least between 0.5° and 1.5°. Furthermore, a plurality of peaks having relatively weak intensity may appear at a Bragg 2θ angle between 1.5° and 3°. The positions of these peaks may be analyzed to identify the structure of the sulfur-containing mesoporous carbon (i.e., the space group of the crystal structure).

In a sulfur-containing mesoporous carbon according to an embodiment of the present invention, the main peak of the Bragg 2θ angle at a CuK-α characteristic X-ray wavelength of 1.541 Å in the X-ray diffraction analysis appears in the range of 0.8 to 1.1°, and the sub-peak thereof appears in the range of 1.2 to 2°.

In a sulfur-containing mesoporous carbon according to another embodiment of the present invention, the main peak of the Bragg 2θ angle at a CuK-α characteristic X-ray wavelength of 1.541 Å in the X-ray diffraction analysis appears at 0.9°, and the sub-peak thereof appears in the range of 1.5 to 2.0°.

In addition, the presence of sulfur in the sulfur-containing mesoporous carbon may be analyzed and the amounts of constituents thereof may be determined through an x-ray photoelectron spectroscopy (XPS) and an elementary analysis. The sulfur-containing mesoporous carbon has XPS and elementary analysis results as follows: C 90±5, O 5±4, S 3±2.5, S/C 0.05±0.04. The XPS analysis is carried out using a PHI Q2000 System. The X-ray source is a mono-chromatic Al K alpha ray (energy: 1486.6 eV). The elementary analyzer (CHNS) is EA1110 (CE Instrument), and the Dynamic Flash Combustion method is used in the elementary analysis. The other conditions of the elementary analyzer (CHNS) are as follows:

Detector: TCD
Column: CHNS—Porapack PQS
Determinant Element: C, H, N, S
Measuring range: 100 ppm-100%
Accuracy (CHNS): N 0.1, C 0.3, H 0.1, S 0.2.

The sulfur-containing mesoporous carbon prepared as described above may be used as a catalyst support and applied to fuel cells for mobile and household equipment including portable electronics, such as notebooks and cellular phones, automobiles, buses, and the like.

A catalyst that contains the mesoporous carbon according to aspects of the present invention as a catalyst support will now be described in detail. The catalyst according to aspects of the present invention includes the sulfur-containing mesoporous carbon, and metal catalyst particles that are supported on the sulfur-containing mesoporous carbon. The metal catalyst particles are dispersed and distributed on the surface and in pores of the sulfur-containing mesoporous carbon.

The sulfur-containing mesoporous carbon has a carbon skeleton structure in which a sulfur atom is substituted. When sulfur is introduced into the carbon skeleton structure, strong interactions between the noble metal catalyst particles, such as Pt or Pt—Ru, supported on the sulfur-containing mesoporous carbon, and the sulfur atoms occur. Thus, the sulfur-containing mesoporous carbon may be used as a catalyst support for fuel cells to prevent the growth of catalyst particles and to maintain a catalytic activity even when driving a fuel cell system at a high temperature for a long period of time.

The metal catalyst that can be used in the catalyst according to aspects of the present invention is not particularly limited, however some examples thereof include Ti, V, Cr, Mn, Fe, Co, Ni, Cu, Zn, Al, Mo, Se, Sn, Pt, Ru, Pd, W, Ir, Os, Rh, Nb, Ta, Pb, Bi, or a combination of these metals. Pt and Pt—Ru alloy exhibit a high affinity for the sulfur-containing mesoporous carbon. A suitable metal catalyst may vary according to a reaction to which the catalyst is to be applied. In addition, the metal catalyst may be a single metal or an alloy of two or more metals.

More particularly, when the catalyst according to aspects of the present invention is used in a catalyst layer of a cathode or an anode of a fuel cell, Pt can be used as the metal catalyst. According to other aspects of the present invention, if the catalyst is used in a catalyst layer of an anode of a DMFC, an alloy of Pt and Ru may be used as the metal catalyst. In this case, the atomic ratio of Pt to Ru may be, in general, in the range of about 0.5:1 to about 2:1. Yet further, if the catalyst is used in a catalyst layer of a cathode of a DMFC, Pt may be used as the metal catalyst.

If the average particle size of the metal catalyst particles is too small, catalyst particles are embedded in the carbon skeleton structure and thus, reactants do not approach the catalyst particles. Thus, the catalytic reaction may not be facilitated. On the other hand, if the average particle size of the metal catalyst particles is too large, the reaction surface area of the all of the catalyst particles is reduced and the efficiency of the catalyst may be reduced. As such, the average particle size of the metal catalyst particles may be in the range of about 1 nm to about 5 nm.

If the amount of metal catalyst contained in the catalyst is too low, it may be impossible to apply the resulting catalyst to a fuel cell. If the amount of metal catalyst particles contained in the catalyst is too large, the manufacturing costs increase and the catalyst particle size may increase. In consideration of these problems, the amount of metal catalyst contained in the catalyst may be in the range of 20 to 90 parts by weight based on 100 parts by weight of the catalyst.

In the catalyst according to aspects of the present invention, if the metal catalyst particles are heat treated, an increase of an average diameter of the metal catalyst particles after heat treatment with respect to an average diameter of the metal catalyst particles before heat treatment is 20% or less, and particularly in the range of 10 to 20%. Like this, the growth of the size of the metal catalyst particles is prohibited. The heat treatment temperature may be in the range of 140 to 160° C.

The catalyst according to aspects of the present invention can be formed using various known methods of producing a catalyst. For example, the catalyst according to aspects of the present invention may be formed by impregnating a support with a metal catalyst precursor solution and then reducing the impregnated metal catalyst precursor. The method of producing a catalyst has been described in various documents in detail, and thus, a description thereof will not be described herein.

A fuel cell according to aspects of the present invention will now be described in detail. The fuel cell according to aspects of the present invention includes a cathode, an anode, and an electrolyte membrane interposed between the cathode and the anode. In this case, at least one of the cathode and the anode includes the catalyst according to aspects of the present invention as described above.

The fuel cell according to aspects of the present invention may be realized as, for example, a PAFC, a PEMFC, or a DMFC. The structures of these fuel cells and methods of manufacturing them are not particularly limited thereto and are described in detail in various documents and the structure and manufacturing method of the fuel cell will not be described herein in detail.

Aspects of the present invention will be described in further detail with reference to the following examples. These examples are for illustrative purposes only and are not intended to limit the scope of the present invention.

Example 1

Preparation of a Sulfur-Containing Mesoporous Carbon 5 g of furfuryl mercaptan, 0.125 g of sulfuric acid and 2.5 g of ethanol were mixed to prepare a homogeneous sulfur-containing carbon source mixture. 1.65 g of the sulfur-containing carbon source mixture was impregnated with 1.5 g of an OMS. The impregnated OMS was dried in an oven at 100° C. for 6 hours, and then, further dried at 160° C. for 6 hours. The dried OMS was impregnated with the remaining sulfur-containing carbon source mixture and dried in an oven at 200° C. for 2 hours. The dried sample was cooled to room temperature and then carbonized at about 900° C. under a nitrogen atmosphere. The resulting product was added to a mixed solution of HF, water, and ethanol and then stirred. The adding and stirring processes were repeated to remove the OMS and to obtain a sulfur-containing mesoporous carbon.

Example 2

A sulfur-containing mesoporous carbon was prepared in the same manner as in Example 1 except that 2.5 g of furfuryl mercaptan and 2.5 g of furfuryl alcohol were used instead of 5 g of furfuryl mercaptan in order to prepare the sulfur-containing carbon source mixture.

Example 3

0.675 g of phenanthrene, 2.025 g of para-toluenesulfonic acid, 1.5 g of sulfuric acid and 60 g of acetone were mixed to prepare a homogeneous sulfur-containing carbon source mixture. 28 g of the sulfur-containing carbon source mixture was impregnated with 1 g of OMS. The impregnated OMS was dried in an oven at 100° C. for 6 hours, and then, further dried at 160° C. for 6 hours. The dried OMS was impregnated with 18.5 g of the remaining sulfur-containing carbon source mixture. The impregnated OMS was dried in an oven at 100° C. for 6 hours, and then, further dried at 160° C. for 6 hours.

The dried OMS was impregnated with 12.2 g of the remaining sulfur-containing carbon source mixture. The impregnated OMS was dried in an oven at 100° C. for 6 hours, and then, further dried at 160° C. for 6 hours. The dried OMS was impregnated with 5.5 g of the remaining sulfur-containing carbon source mixture. The impregnated OMS was dried in an oven at 100° C. for 6 hours, and then, further dried at 160° C. for 6 hours. The dried sample was cooled to room temperature and then carbonized at about 900° C. under a nitrogen atmosphere. The resulting product was added to a mixed solution of HF, water, and ethanol and then stirred. The adding and stirring processes were repeated to remove the OMS and to obtain a sulfur-containing mesoporous carbon.

Example 4

A sulfur-containing mesoporous carbon was prepared in the same manner as in Example 3 except that 2.7 g of para-toluenesulfonic acid, 1.5 g of sulfuric acid and 60 g of acetone were used instead of 0.675 g of phenanthrene, 2.025 g of para-toluenesulfonic acid, 1.5 g of sulfuric acid and 60 g of acetone g in order to prepare the sulfur-containing carbon source mixture.

Comparative Example 1

A sulfur-containing mesoporous carbon was prepared in the same manner as in Example 1 except that 5 g of furfuryl alcohol was used instead of 5 g of furfuryl mercaptan to prepare a sulfur-containing carbon source mixture.

Figure 2B:
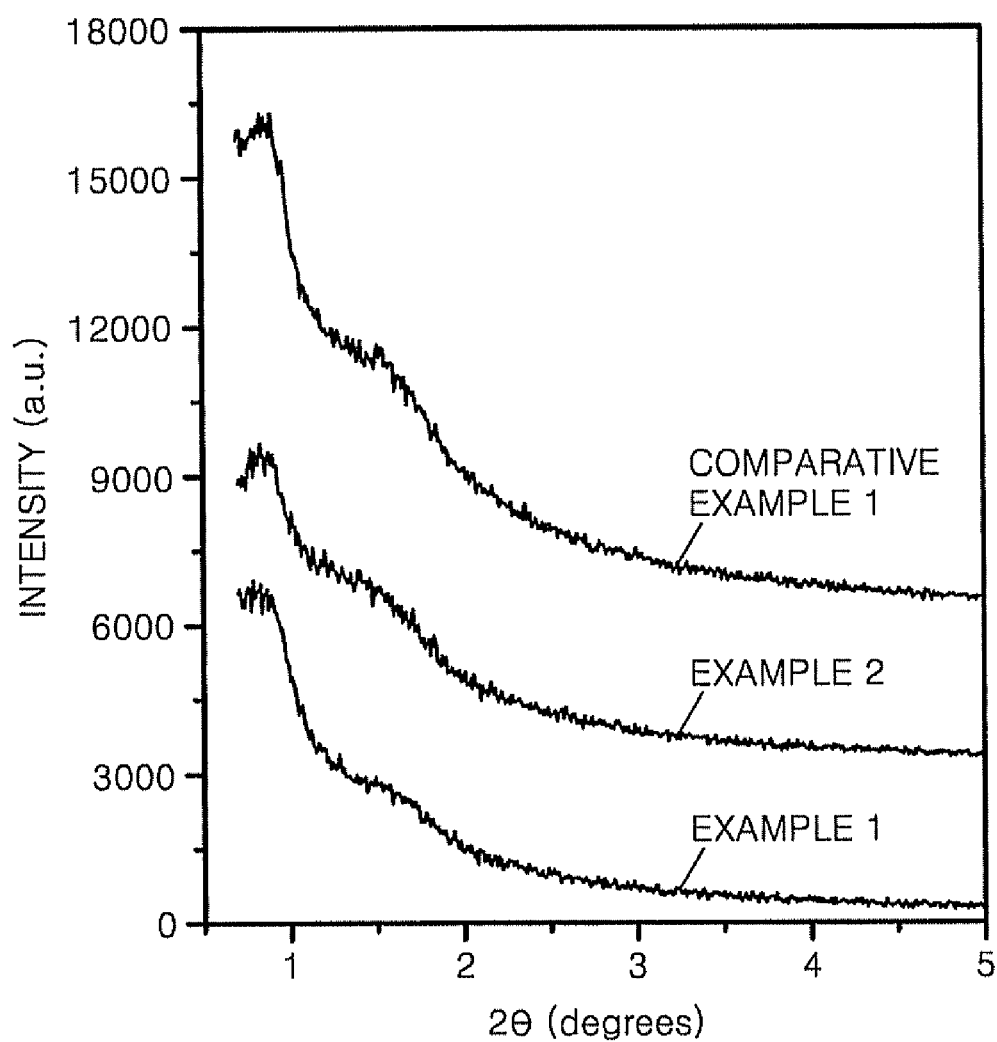
FIG. 2B is a graph illustrating the results of an X-ray diffraction analysis of mesoporous carbons prepared in Examples 1 and 2 and Comparative Example 1, according to aspects of the present invention.

FIG. 2B illustrates the results of an X-ray diffraction analysis on the mesoporous carbons prepared in Examples 1 and 2 and Comparative Example 1. Referring to FIG. 2B, the mesoporous carbons prepared in Examples 1 and 2 and Comparative Example 1 exhibit structural regularity in the mesoscale range.

Figure 3A:
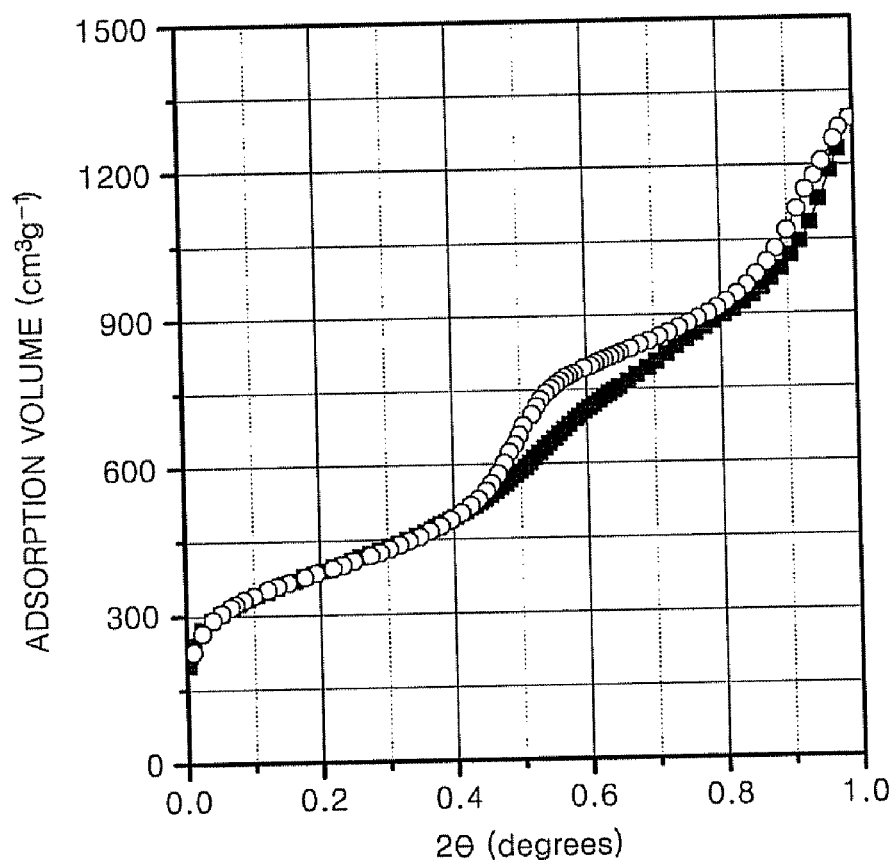
FIG. 3A illustrates a nitrogen adsorption isotherm of a mesoporous carbon manufactured in Example 1, according to aspects of the present invention.
Figure 3B:
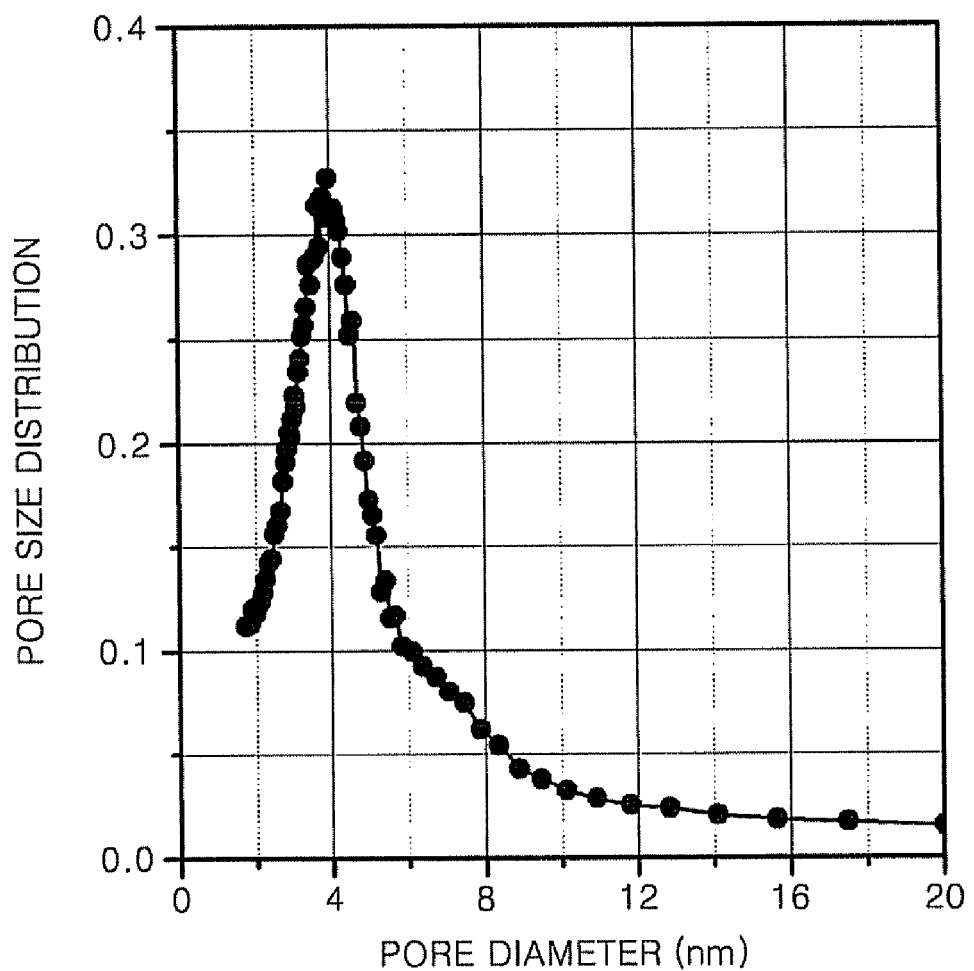
FIG. 3B illustrates a pore size distribution of a mesoporous carbon manufactured in Example 1, according to aspects of the present invention.

Further, a nitrogen adsorption property of the mesoporous carbons prepared in Examples 1 and 2 and Comparative Example 1 was determined. FIG. 3A illustrates the nitrogen adsorption isotherm of the mesoporous carbon prepared in Example 1. And, FIG. 3B illustrates a pore size distribution of the mesoporous carbon of Example 1, according to aspects of the present invention. The BET surface area, pore volume, and average pore diameter of the mesoporous carbons prepared in Examples 1 through 4 and Comparative Example 1 are given in Table 1.

TABLE 1

| | BET surface area ($m^2/g$) | Pore volume ($cm^3/g$) | Average pore diameter (nm) |
|---|---|---|---|
| Example 1 | 1385 | 2.00 | 4.0 |
| Example 2 | 1458 | 1.94 | 3.9 |
| Example 3 | 924 | 1.21 | 5 |
| Example 4 | 997 | 1.48 | 3.8 |
| Comparative Example 1 | 1337 | 2.03 | 3.8 |

As apparent from FIGS. 3A and 3B and Table 1, the mesoporous carbons prepared in Examples 1 through 4 and Comparative Example 1 have pores in a mesopores range, a high BET surface area, and high pore volume.

Figure 4:
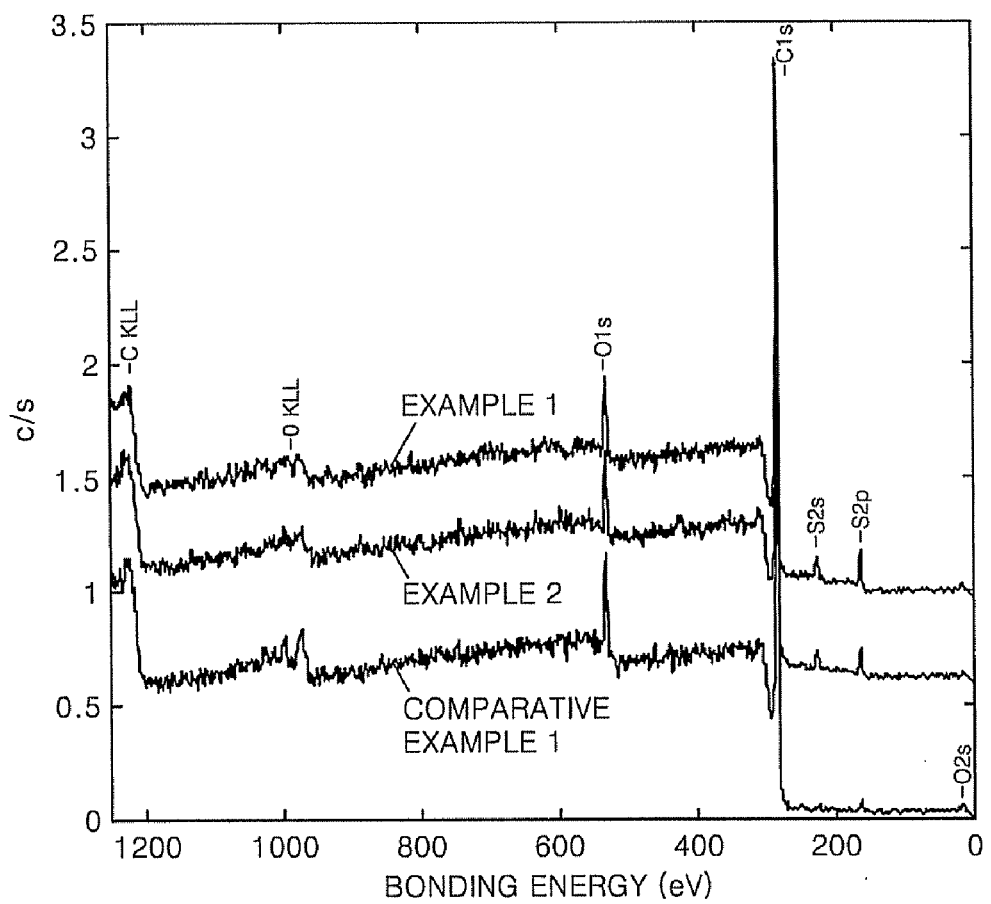
FIG. 4 illustrates the results of XPS (X-ray Photoelectron Spectroscopy) on mesoporous carbons prepared in Examples 1 and 2 and Comparative Example 1, according to aspects of the present invention.

The mesoporous carbons prepared in Examples 1 through 4 and Comparative Example 1 were analyzed through XPS and the results are illustrated in FIG. 4 and Table 2. The atomic concentration is given in Table 2.

TABLE 2

| | C 1 s | O 1 s | S 1 s | S/C |
|---|---|---|---|---|
| Example 1 | 90.61 | 6.78 | 2.61 | 0.029 |
| Example 2 | 92.24 | 6.05 | 1.71 | 0.019 |
| Example 3 | 94.7 | 3.6 | 1.5 | 0.016 |
| Example 4 | 95.6 | 2.2 | 2.3 | 0.024 |
| Comparative Example 1 | 92.14 | 7.49 | 0.37 | 0.004 |

As apparent from FIG. 4 and Table 2, the concentration of sulfur in the final OMC increases as the amount of furfuryl mercaptan increases.

Example 5

Manufacture of a Supported Catalyst and Fuel Cell 0.5 g of the sulfur-containing mesoporous carbon prepared in Example 1 was placed in a vinyl bag. Then, 1.9232 g of $H_2PtCl_6$ was dissolved in 1.5 ml of acetone and added to the vinyl bag containing the sulfur-containing mesoporous carbon. The mixed solution was dried in air for four hours, transferred to a crucible, and then, dried in a drier at 60° C. overnight. Then, the crucible was placed in an electric furnace through which nitrogen flowed. The nitrogen was allowed to flow for 10 minutes, and then was replaced with hydrogen. The temperature was increased from room temperature to 200° C., and then maintained at 200° C. for 2 hours so that a Pt salt supported on the sulfur-containing mesoporous carbon was reduced. The gas in the electric furnace was replaced with nitrogen. The temperature was increased to 350° C. at a rate of 5° C./min, maintained at 350° C. for 5 hours, and then slowly cooled to room temperature.

The resulting product was dissolved in 1.5 mL of acetone and placed in a vinyl bag containing a mesoporous carbon. The above-stated processes were repeated to re-reduce the Pt salt supported on the sulfur-containing mesoporous carbon. As a result, a supported catalyst in which the concentration of impregnated Pt was 60% by weight was obtained.

The supported catalyst was dispersed in a solution of Nafion® 115 (produced by Du Pont) in isopropyl alcohol to form a slurry. The slurry was coated on a carbon electrode through a spraying process such that the loading of the coated catalyst was 3 mg/cm$^2$ based on the amount of Pt. Then, the molded carbon electrode was allowed to pass through a rolling machine to increase adhesion between a catalyst layer and a carbon paper and thereby forming a cathode.

An anode was produced using a commercially available PtRu black catalyst. Then, a unit cell was produced using the cathode and the anode.

Example 6

Manufacture of a Supported Catalyst and Fuel Cell

A supported catalyst and a fuel cell were manufactured in the same manner as in Example 3 except that Pt was supported on the sulfur-containing mesoporous carbon of Example 2 instead of the sulfur-containing mesoporous carbon of Example 1.

Comparative Example 2

Manufacture of a Supported Catalyst and Fuel Cell

A supported catalyst and a fuel cell were manufactured in the same manner as in Example 3 except that Pt was supported on the sulfur-containing mesoporous carbon of Comparative Example 1 instead of the sulfur-containing mesoporous carbon of Example 1.

Comparative Example 3

Manufacture of a Supported Catalyst and Fuel Cell

A fuel cell was manufactured in the same manner as in Example 3 using a CCC Duralyst produced by Columbian Chemical Company as a supported catalyst. The CCC Duralyst is a supported catalyst in which 60% by weight of Pt is supported on carbon.

Comparative Example 4

Manufacture of a Supported Catalyst and Fuel Cell

A fuel cell was manufactured in the same manner as in Example 3 using E-TEK 60Pt/C produced by E-Tek as a supported catalyst. Here, E-TEK 60Pt/C is a supported catalyst in which 60% by weight of Pt is supported on carbon.

Figure 5:
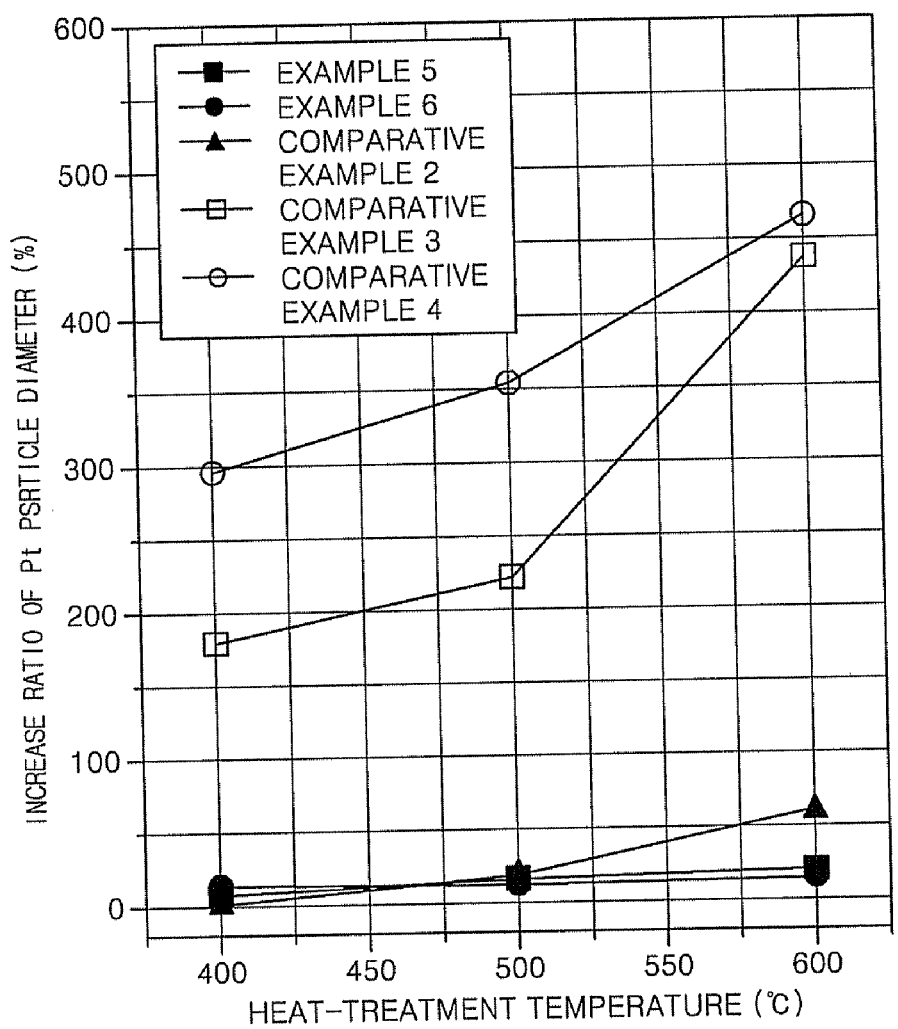
FIG. 5 is a graph illustrating Pt particle diameters change with respect to heat-treatment temperature when heat-treating Pt/C catalysts manufactured in Examples 5 and 6 and Comparative Examples 2-4 for 2 hours at 400° C., 500° C. and 600° C. under a nitrogen gas atmosphere according to aspects of the present invention.

The Pt/C catalysts manufactured in Examples 3 and 4 and Comparative Examples 2-4 were heat-treated at 400° C., 500° C. and 600° C. for 2 hours under a nitrogen gas atmosphere. The average diameter of the Pt particles was determined with respect to the heat-treatment temperature and the results are shown Table 3. FIG. 5 illustrates the increase ratio of the diameter of the Pt/C catalysts with respect to heat-treatment temperature.

TABLE 3

| Example | Diameter before heat-treatment (nm) | 400° C. Diameter (nm) | 400° C. Increase Ratio[1] (%) | 500° C. Diameter (nm) | 500° C. Increase Ratio[1] (%) | 600° C. Diameter (nm) | 600° C. Increase Ratio[1] (%) |
|---|---|---|---|---|---|---|---|
| Example 5 | 3.76 | 4.12 | 9.6 | 4.34 | 15.4 | 4.47 | 18.9 |
| Example 6 | 3.35 | 3.82 | 14.0 | 3.86 | 15.2 | 3.90 | 16.4 |
| Comparative Example 2 | 3.26 | 3.33 | 2.1 | 3.86 | 18.4 | 5.20 | 59.5 |
| CCC Duralyst (Comparative Example 3) | 2.34 | 6.61 | 182.5 | 7.58 | 223.9 | 12.61 | 438.9 |
| E-TEK 60Pt/C (Comparative Example 4) | 4.86 | 19.23 | 295.7 | 22.07 | 354.1 | 27.47 | 465.2 |

[1]Increase ratio = {(average particle diameter of a supported catalyst after heat-treatment − average particle diameter of a supported catalyst before heat-treatment)/(average particle diameter of supported catalyst before heat-treatment)} × 100

As apparent from Table 3 and FIG. 5, the catalysts according to Examples 5 and 6 have a growth rate of Pt particles lower than the commercially available catalysts of Comparative Examples 3 and 4 when increasing the temperature. Further, the Examples 5 and 6 have variations in Pt particle diameter with respect to a temperature that are less than the catalyst of Comparative Example 2, which contains no sulfur. Thus, it can be seen that a sulfur atom contained in an OMC strongly supports Pt catalyst particles, and the growth of particles due to heat-treatment is prevented.

Figure 6:
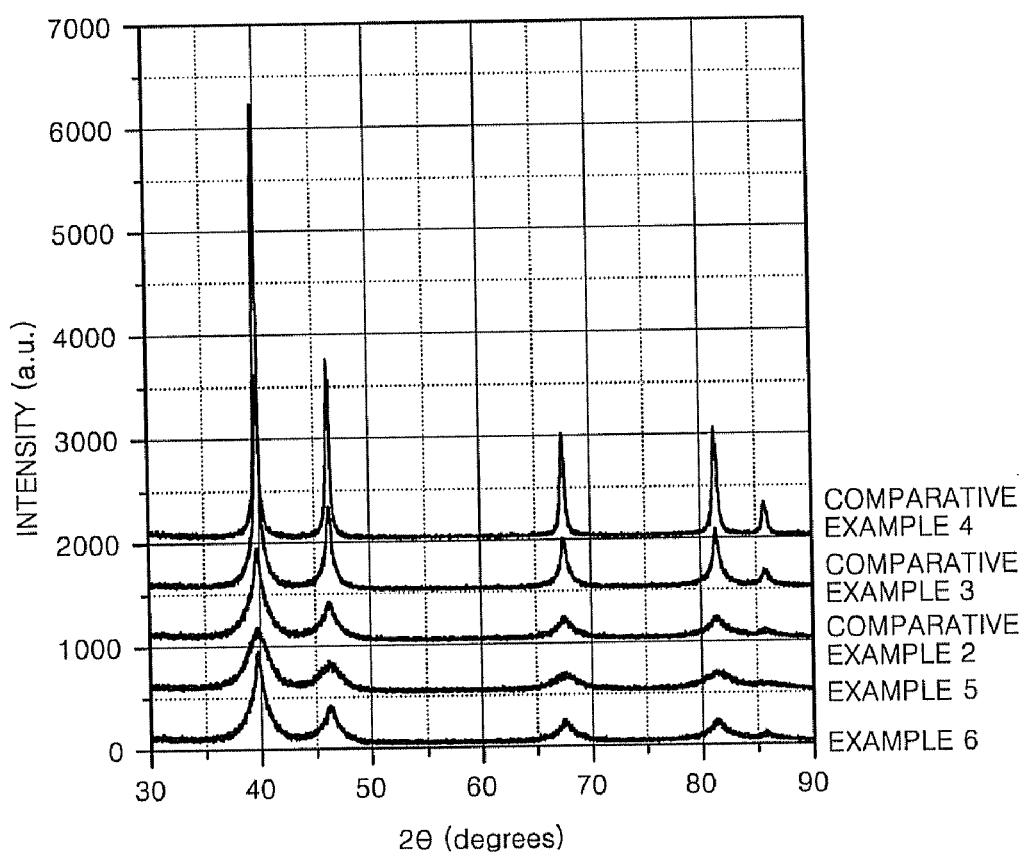
FIG. 6 is a graph illustrating the results of an X-ray diffraction analysis of mesoporous carbon manufactured in Examples 5 and 6 and Comparative Examples 2-4 after heat-treating them for 2 hours at 600° C. under a nitrogen gas atmosphere, according to aspects of the present invention.

The mesoporous carbons used in Examples 5 and 6 and Comparative Examples 2-4 were heat-treated at 600° C. under a nitrogen gas atmosphere for 2 hours and an X-ray diffraction analysis was performed. The results are illustrated in FIG. 6. Referring to FIG. 6, the Pt particles supported on the mesoporous carbon of Comparative Example 2 (containing no sulfur) and commercially available catalysts of Comparative Examples 3 and 4 have a sharper X-ray diffraction linewidth than Pt particles supported on the sulfur-containing mesoporous carbons used in Examples 5 and 6 which indicates that the diameters of the Pt particles of the Comparative Examples 2-4 increased.

Figure 7:
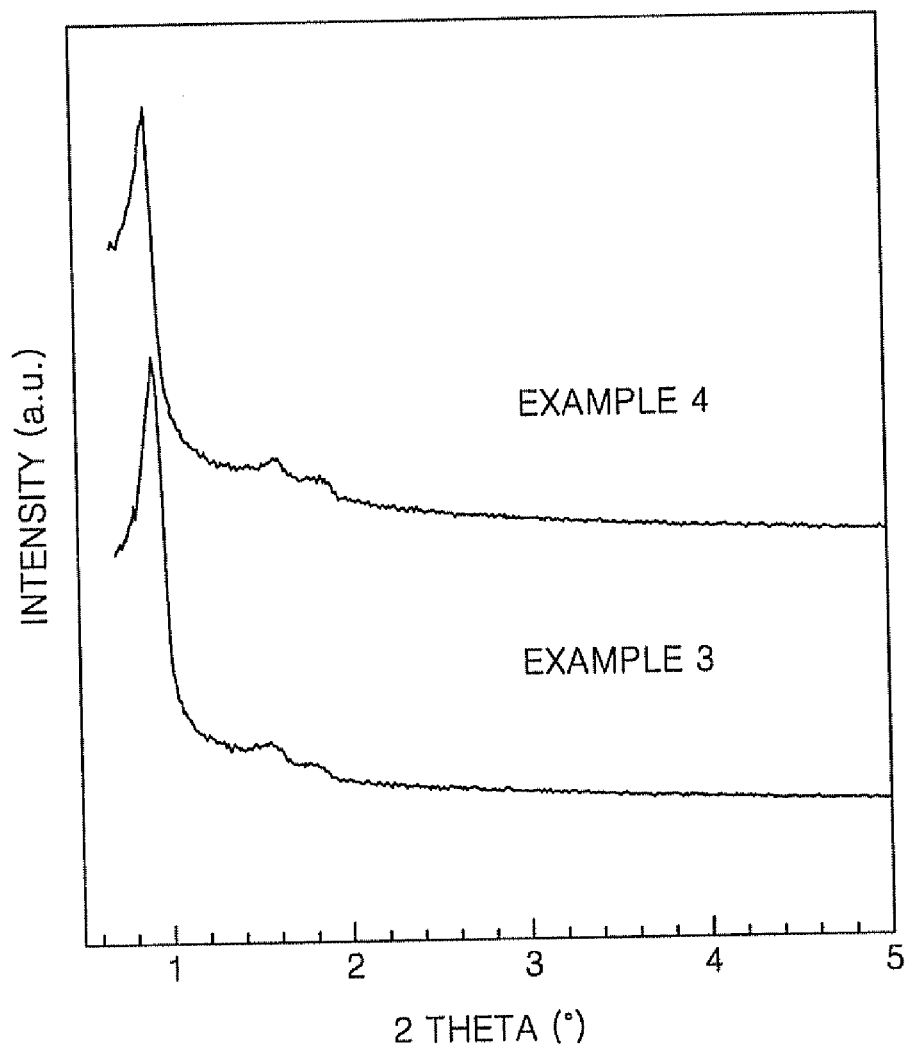
FIG. 7 is a graph illustrating the results of an X-ray diffraction analysis of mesoporous carbons manufactured in Examples 3 and 4.

Referring to the XRD patterns shown in FIG. 7, in the sulfur-containing mesoporous carbons of Examples 3 and 4, the main peak appears at 0.9°, and the sub-peak appears in the range of 1.5 to 1.8°. From the result, it can be seen that the sulfur-containing mesoporous carbons of Examples 3 and 4 are carbons having a very high ordered structure.

Figure 8:
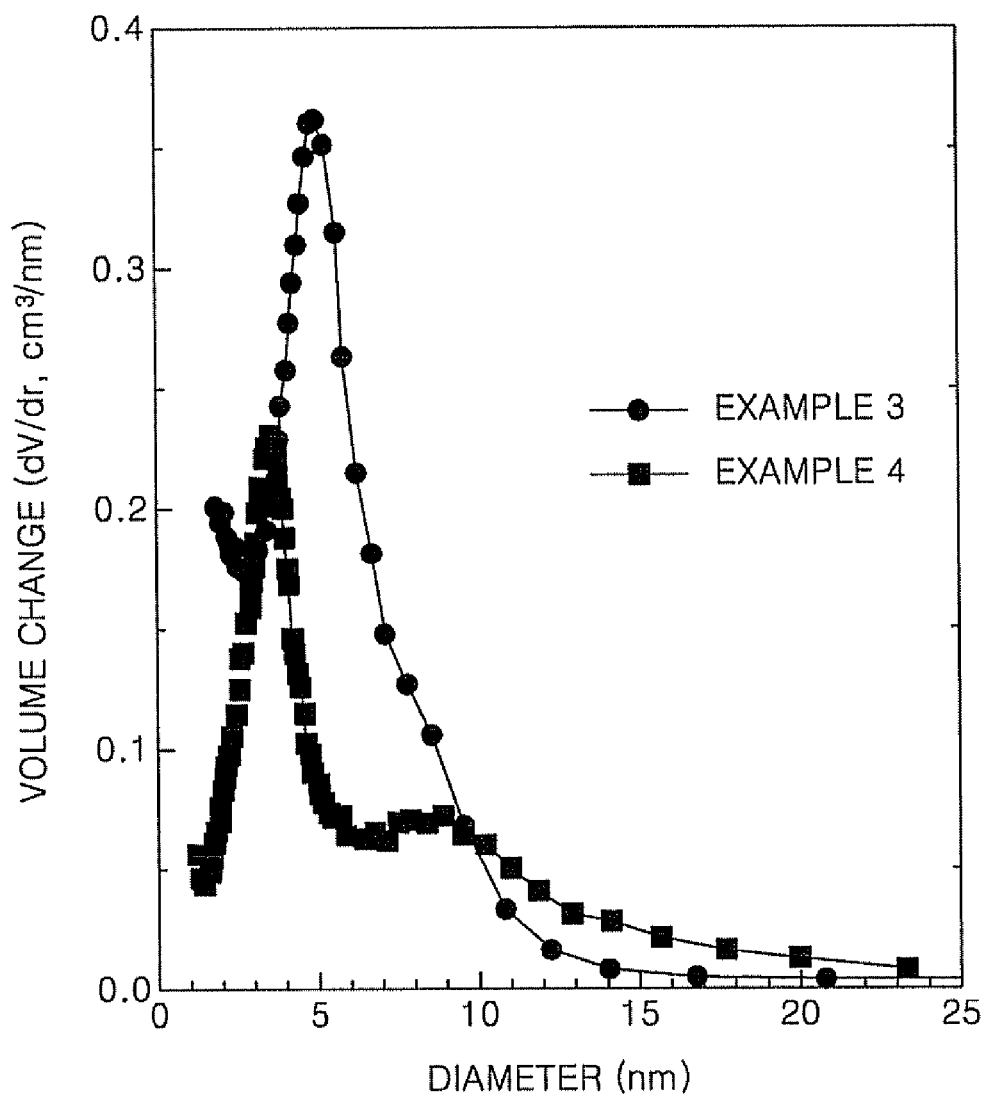
FIG. 8 is a graph illustrating a pore size distribution of mesoporous carbons manufactured in Examples 3 and 4.

In addition, the analysis results of a pore size distribution using nitrogen absorption properties of the sulfur-containing mesoporous carbons of Examples 3 and 4 are shown in FIG. 8. Referring to FIG. 8, the average pore diameter of the sulfur-containing mesoporous carbons of Examples 3 and 4 is in the range of 2 to 10 nm. In particular, the sulfur-containing mesoporous carbon of Example 3 has an average pore diameter of about 5 nm and a FWHM of about 2.5 to 2.8 nm, and the sulfur-containing mesoporous carbon of Example 4 has an average pore diameter of about 3.5 nm and a FWHM of about 2 to 2.3 nm.

The performance of the unit cells manufactured in Examples 5 and 6 and Comparative Examples 2-4 was measured at 50° C. while flowing 2M methanol and an excess of air in the unit cells. As a result, it can be seen that the fuel cells of Examples 5 and 6 have an improved efficiency as compared to the fuel cells manufactured to include Comparative Examples 2-4.

The sulfur-containing mesoporous carbon has a high affinity for and adhesion to catalyst particles due to a sulfur atom introduced into an OMC carbon skeleton structure. Thus, the growth of metal catalyst particles is effectively prevented when heat-treating the metal catalyst particles at a high temperature as compared to catalysts supported on commercially available supported catalysts and an OMC containing no sulfur. The catalyst using the sulfur-containing mesoporous carbon can be applied to a fuel cell to prevent a reduction in a catalytically active area due to increased particle size by agglomeration of catalyst particles even when driving the fuel cell for a long period of time. The catalyst containing the sulfur-containing mesoporous carbon as a catalyst support can be used to manufacture a fuel cell having an improved efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A supported catalyst, comprising:
   an sulfur-containing, ordered mesoporous carbon, having regularly arranged mesopores with an average diameter of 2 to 10 nm; and
   metal catalyst particles supported on the mesoporous carbon,
   wherein the mesoporous carbon has a carbon skeleton structure in which sulfur atoms are substituted for carbon atoms.

2. The catalyst of claim 1, wherein the amount of metal catalyst particles is 20 to 90 parts by weight based on 100 parts by weight of the supported catalyst.

3. The catalyst of claim 1, wherein, when the metal catalyst particles are heat treated, an increase of an average diameter of the metal catalyst particles after heat treatment, with respect to an average diameter of the metal catalyst particles before heat treatment, is 20% or less.

4. The catalyst of claim 1, wherein the amount of sulfur is 0.1 to 20 parts by weight based on 100 parts by weight of the mesoporous carbon.

5. The catalyst of claim 1, wherein the average diameter of the mesopores is 3 to 6 nm.

6. The catalyst of claim 1, wherein a full width at half maximum (FWHM) of a main peak of the mesoporous carbon, obtained by a pore size distribution using nitrogen absorption properties, is 5 nm or less.

7. The catalyst of claim 1, wherein a main peak of a Bragg 2θ angle for a CuK-α characteristic X-ray wavelength of 1.541 Å appears at least between 0.5° and 1.5°.

8. The catalyst of claim 1, wherein the having a Brunauer, Emmett, and Teller (BET) surface area of 200-2000 $m^2/g$ and a sheet resistance of 10-300 $m\Omega/cm^2$ at 150.8±3.0 $kgf/cm^2$.

9. A fuel cell, comprising:
   a cathode;
   an anode; and
   an electrolyte interposed between the cathode and the anode,
   wherein at least one of the cathode and the anode comprises a supported catalyst comprising:
   an sulfur-containing, ordered mesoporous carbon, having regularly arranged mesopores with an average diameter of 2 to 10 nm; and
   metal catalyst particles supported on the mesoporous carbon,
   wherein the mesoporous carbon has a carbon skeleton structure in which sulfur atoms are substituted for carbon atoms.

* * * * *